United States Patent [19]
Pagani et al.

[11] Patent Number: 5,298,209
[45] Date of Patent: Mar. 29, 1994

[54] METHOD OF FABRICATING HIGHLY COMPRESSED COVERING MATERIAL FROM A PLASTICS MATERIAL

[75] Inventors: Pierluigi Pagani, Locarno; Roberto Bianchi, Minusio, both of Switzerland

[73] Assignee: Forbo-Giubiasco SA, Giubiasco, Switzerland

[21] Appl. No.: 763,600

[22] Filed: Sep. 23, 1991

[30] Foreign Application Priority Data
Oct. 3, 1990 [CH]  Switzerland ............... 03179/90

[51] Int. Cl.⁵ ................. B29C 31/06; B29C 43/48
[52] U.S. Cl. ........................ 264/105; 264/122; 264/166; 264/316; 264/320; 264/175; 425/371
[58] Field of Search ............ 264/105, 122, 175, 280, 264/316, 165, 166, 320; 425/371

[56] References Cited

U.S. PATENT DOCUMENTS

| | | | |
|---|---|---|---|
| 3,594,461 | 7/1971 | Jacob | 425/371 |
| 3,764,247 | 10/1973 | Garrett et al. | 425/371 |
| 3,852,387 | 12/1974 | Bortnick et al. | 264/175 |
| 4,128,369 | 12/1978 | Kemerer et al. | 425/371 |
| 4,375,350 | 3/1983 | Sato | 425/371 |
| 4,615,853 | 10/1986 | Aoyama et al. | 425/371 |

Primary Examiner—Jeffery Thurlow
Assistant Examiner—Mathieu Vargot
Attorney, Agent, or Firm—Oliff & Berridge

[57] ABSTRACT

A highly compressed covering material is fabricated by pressing a lumpy plastics material or plastics pre-product. The plastics material or plastics pre-product is thereby fed into a double-belt press by continuously and dosedly feeding the plastics material or plastics pre-product into a region formed by lateral delimiting elements at the lower belt of the double-belt press. The continuous pressing to form the highly compressed covering material is accomplished there during heating and with increasing pressure.

18 Claims, 3 Drawing Sheets

METHOD OF FABRICATING HIGHLY COMPRESSED COVERING MATERIAL FROM A PLASTICS MATERIAL

BACKGROUND OF THE INVENTION

The present invention broadly relates to the fabrication of covering material, e.g. for floorings or floor coverings and, more specifically, pertains to a new and improved method of fabricating highly compressed covering material by pressing a lumpy plastics material or a plastics pre-product during heat action. The present invention also relates to a new and improved apparatus for performing the inventive method.

Highly compressed floor coverings made of a plastics material were the response or rather the reaction to the ladies' high-heeled shoes that came into vogue in the early fifties and continued in fashion the greater part of the sixties. Such highly compressed flat or planar products possess a substantially homogeneous structure and have mechanical properties capable of meeting heavy-duty strain and very rough handling. Particularly, a high abrasion resistance as well as a high resilience are requisite for a resilient flooring. Such highly compressed material can be also fabricated in a conductive manner or form which is advantageous for various uses or applications.

Highly compressed floor coverings are hitherto fabricated according to discontinuous batch-processing methods and in presses operating in batch quantities. The lumpy plastics material, which is used as the starting or basic material and provided, for example, in the form of pellets or chips or bits, is brought or fed into a container. A cover is placed on this container, whereupon the container and the cover are put in place between the plates of a press. Simultaneously with the pressing operation, the container is also heated. The process is always carried out with an excess of material which, upon reaching the given or predetermined material volume between the container rim and the cover, can escape or exit from the container. In order to minimize loss or waste of material and avoid rejects or scrap, the starting material must be accurately weighed-in prior to each pressing or molding operation or cycle. According to this known method, the process is performed with pressures between 30 bar and maximum 50 bar. The resulting blocks having, for example, a thickness of 14 mm, are then split into thinner plates or layers. The individual plates are ground and tempered, and cut to smaller sizes and ultimately installed or laid. The produced plates or layers are substantially non-directional, i.e. they possess the same properties in all directions. Such thin plates are suitable as a floor covering, but also as a covering or cover material for other applications or purposes, where they are subjected to heavy-duty strain or load, for instance the loading area of fork lift trucks. Such covering material is so durable that the connection or joining element between the fork lift truck and the plastics covering is sooner damaged than the plastics covering itself.

This prior art method for discontinuous batch processing is disadvantageous in that, apart from the weighing in of each individual batch, the transfer or conveyance of the material, which is to be pressed, to the press uprights, which are arranged in tandem and independent of each other, represents a relatively time-consuming and manually executed preparatory operation. Accordingly, the discontinuous process is uneconomical in every respect. Furthermore, only covering plates of a certain size and of an average thickness can be fabricated. There is also the possibility of rejects when the transfer of the material to be pressed from one press upright to another is not effected rapidly enough. In other words, the quality of production is strongly dependent on the aptitude and the alertness of the operating personnel.

According to a continuous method known to the art, the floor coverings are fabricated from calandered foils by lamination on a steel roll. The required calandered foils must be already available in a highly compressed form. This means that the lamination process is preceded by a relatively energy-consuming pressing or compressing step. As a result of calandering, the properties of the laminated products in the longitudinal direction differ from those in the transverse direction. The mechanical properties thereof are substantially inferior to those of homogeneously pressed coverings. The thickness of these floor coverings is limited, on the one hand, because generally only two to three foils of approximately up to 1 mm thickness can be used and, on the other hand, because—according to belt or roll material—work on a laminating machine or laminator can be carried out only in the pressure range of 2 to 6 bar. In the case of several foils, the heat required to bond the individual foils is substantially weaker towards the center of the floor covering as a result of self-insulation. Accordingly, the melt connection or fusion between the individual layers possesses only a limited wear resistance. Furthermore, since the melt-on of the material in the fringe regions of the layers takes time, this prior art continuous process is relatively slow and thus time-consuming.

SUMMARY OF THE INVENTION

Therefore, with the foregoing in mind, it is a primary object of the present invention to provide a new and improved method of, and an apparatus for, fabricating highly compressed covering material from a plastics material, which method and apparatus do not suffer from the aforementioned drawbacks and shortcomings of prior art methods.

Another and more specific object of the present invention aims at providing a new and improved method of, and an apparatus for, fabricating highly compressed covering or cover material from a lumpy plastics material or plastics pre-product, by means of which a continuous process can be automatically performed practically without manual labor, such process providing a product equivalent to that obtained according to the aforedescribed discontinuous method.

Now in order to implement these and still further objects of the present invention, which will become more readily apparent as the description proceeds, the method of the present development is manifested, among other things, by the steps of feeding the lumpy plastics material or plastics pre-product into a double-belt press by continuously and dosedly feeding the lumpy plastics material or plastics pre-product into a region formed by lateral delimitations at the lower belt of the double-belt press, subjecting the plastics material or plastics pre-product to heating and to increasing pressure, and continuously pressing the plastics material or plastics pre-product.

Known double-belt presses are hitherto used for the production of chipboards or particle boards. These boards consist of a mechanical mixture of wood chips and a mixed or two-component adhesive. The wood chips and the adhesive are mixed to form a coherent mass or compound in which the wood chips are embedded in an adhesive-substance matrix. The mass or compound provided by a mixer is precompressed and formed. Such precompressed and formed compound is then brought into the continuously operating press. The molded laminated material discharged from the press is not at all homogeneous, inasmuch as the two outer layers are hardened or baked to a greater extent than the mid-layer region. Accordingly, the mid-layer region possesses a lower degree of hardness than the two outer layers. Furthermore, air remains trapped in the mid-layer region of such molded laminated material. However, in the case of chipboards, the softer mid-layer region and the entrapped or enclosed air are unimportant, inasmuch as the chip or particle boards, in contrast to floor coverings or flooring materials, are subjected to no higher load and particularly to no higher pressure load.

In order to obtain a substantially homogeneous product fabricated in accordance with the teachings of the inventive method, the pressing process is performed with increasing pressure. In other words, the pressure in the plastics-material layer is continuously increased or built up, in order that first the air present between the lumpy parts is driven out and that, thereafter, the air can still escape during heating and compression of the already melting lumpy parts. The fabricated product should, under no circumstances, contain an inclusion or trapping of air. Preferably, the pressing process is performed also with rising or increasing temperature.

A particularly preferable variant of the inventive method is characterized in that, along a first section of the double-belt press, the air contained in the developing covering material is eliminated by means of increasing pressure while gradually raising the temperature, and that in an adjacent second section of the double-belt press the covering material is compressed to the desired density at a substantially high temperature, while in a third section of the double-belt press the obtained covering material is stabilized at a decreasing temperature and under a steady or increasing pressure.

If a plastics pre-product, for instance an epoxy resin or a polyester, is employed, the reaction to form the desired plastics material is preferably accomplished in the first section or, as the case may be, the first two sections of the double-belt press.

The lumpy plastics material or plastics pre-product can be deposited on the lower belt of the double-belt press as a layer that is uniformly thick over or across the entire width thereof, or as a layer that is thicker in the middle, the thickness of which decreases towards the edges of the layer. In the case of the layer with the thicker middle portion, movement and intermixing of the material occur during melting and compression thereof, which can be exploited or utilized for certain, for instance, decorative effects.

Suitable plastics materials are generally materials that are deformable and meltable under pressure and heat, such as polyvinyl chloride, polyethylene, polyurethane and polypropylene. The plastics materials can contain or can be coated with pigments or a conductive material for the purpose of achieving or producing special color effects or antistatic or anti-electrostatic properties.

Homogeneous moldings can be pressed or compressed up to a pressure of approximately 50 bar by means of a suitable double-belt press. In other words, there can be achieved a material which with respect to quality is equivalent to the material produced according to the aforedescribed discontinuous batch-processing method.

While the molded laminate produced according to the aforedescribed continuous method can be further compressed by lamination, the covering material fabricated according to the inventive method is no longer compressible. This means that the covering material has reached its maximum possible density. This density is homogeneous over or across the thickness of the covering material, this not being the case in molded laminated materials.

By virtue of the inventive method, in which the compression step is followed in full continuity by the stabilization step, the possibility of producing rejects or defective material is precluded.

The inventive method renders possible the fabrication of highly compressed and homogeneous flat products having, for example, a thickness of up to 20 mm. By virtue of the inventive continuous method, the length of the product is not limited, so that floor coverings of any optional length can be produced. Such coverings can be rolled and stored in the form of material webs. Installing or laying webs or larger plates is faster and less labor-intense.

The products fabricated according to the teachings of the inventive method are used in the first place as floor coverings. However, they are likewise suitable as wall coverings, table coverings or any other highly wear-resistant coverings. Apart from the excellent mechanical properties of such products, the conductivity of the material is also an important characteristic feature.

The inventive method is also advantageous in that the process does with a very low labor content, considering the fact that as soon as the process conditions are set subsequent to running preliminary tests, the press will automatically operate and produce a uniform product. This is quite in contrast to the batch-processing method, according to which material is weighed-in for each batch which is then individually pressed. The finished product must be individually taken out of the press, whereby the quality of the finished products can vary from product to product.

By virtue of the high productivity rendered possible by the inventive method, it is economical to produce thinner material webs, for example, webs having a thickness of 6 mm. A further optimization of the material quality and of the uniformity of the floor coverings is thereby possible. At the same time, further processing as well as storing are facilitated.

As alluded to above, the invention is not only concerned with the aforementioned method aspects, but also relates to a new and improved apparatus for performing and carrying out the inventive method of fabricating highly compressed covering material from a plastics material or a plastics pre-product.

The apparatus constructed according to the invention is manifested, among other things, by the features that there are provided a dosing device for the lumpy material and a heatable double-belt press arranged directly downstream of the dosing device. The heatable double-belt press comprises a lower pressing belt and an upper pressing belt. The lower pressing belt is provided at its two edges with respective delimiting elements extending along and substantially parallel to the two edges.

The dosing device can be advantageously structured to comprise a funnel-shaped container having a controllable opening or outlet. Other known constructions, e.g. with perforated rolls and the like, can be also employed. However, it is essential that the dosing of the lumpy material is continuous and accurate.

In order that the continuous process according to the invention is at all possible, the layer of the lumpy starting material and subsequently the molding must be laterally delimited in the direction substantially parallel to the longitudinal or machine direction. This can be effected or accomplished by chain-shaped or fan-shaped delimiting elements arranged in continuous manner, i.e. in rows, at the edges of the pressing belts. These delimiting elements limit or restrict the lateral dimensions of the layer as well as of the finished molding, and thereby ensure the uniform thickness of the layer. The delimiting elements conjointly define with the two pressing belts of the double-belt press a space, in which the covering material is formed during the process according to the inventive method. The lateral delimiting elements are arranged such that excess material can escape during the pressing operation. The height of the lateral delimiting elements is dimensioned such that, even in the fully pressed condition of the pressing belts, the lower delimiting elements do not contact the upper pressing belt and the upper delimiting elements do not contact the lower pressing belt. This spacing or clearance between the lateral delimiting elements and the respective opposite pressing belts is necessary, in order that the double-belt press is not damaged at high pressure loads. Furthermore, this spacing or clearance can enable the escape or exit of excess material.

Lumpy plastics materials or plastics pre-products are suitable as the starting or basis material. The form of the parts or pieces of the lumpy starting material can be spherical, discoid, cubical, granule-shaped or shaped in some other way. When plastics pre-products are employed, such pre-products can completely react in the double-belt press. The melting behavior of the starting materials is obviously different according to form and type of material, so that the optimum conditions for different forms or particle sizes have to be determined by preliminary experiments or tests.

The quality and the exact volume of the molding are determined by the accurate control of the dosing and of the increasing pressing power as well as of the ultimate pressure. The control of the dosing operation as well as the control of the temperature and the pressure load along the pressing and stabilization stretch can be appropriately effected in accordance with known control methods.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters or numerals to denote the same or analogous components and wherein.

DETAILED DESCRIPTION OF THE PREFERRED EMBODIMENTS

Describing now the drawings, it is to be understood that to simplify the showing thereof, only enough of the construction of the apparatus for carrying out the inventive method of fabricating highly compressed covering material from a lumpy plastics material or plastics pre-product has been illustrated therein as is needed to enable one skilled in the art to readily understand the underlying principles and concepts of this invention.

Figure 1:
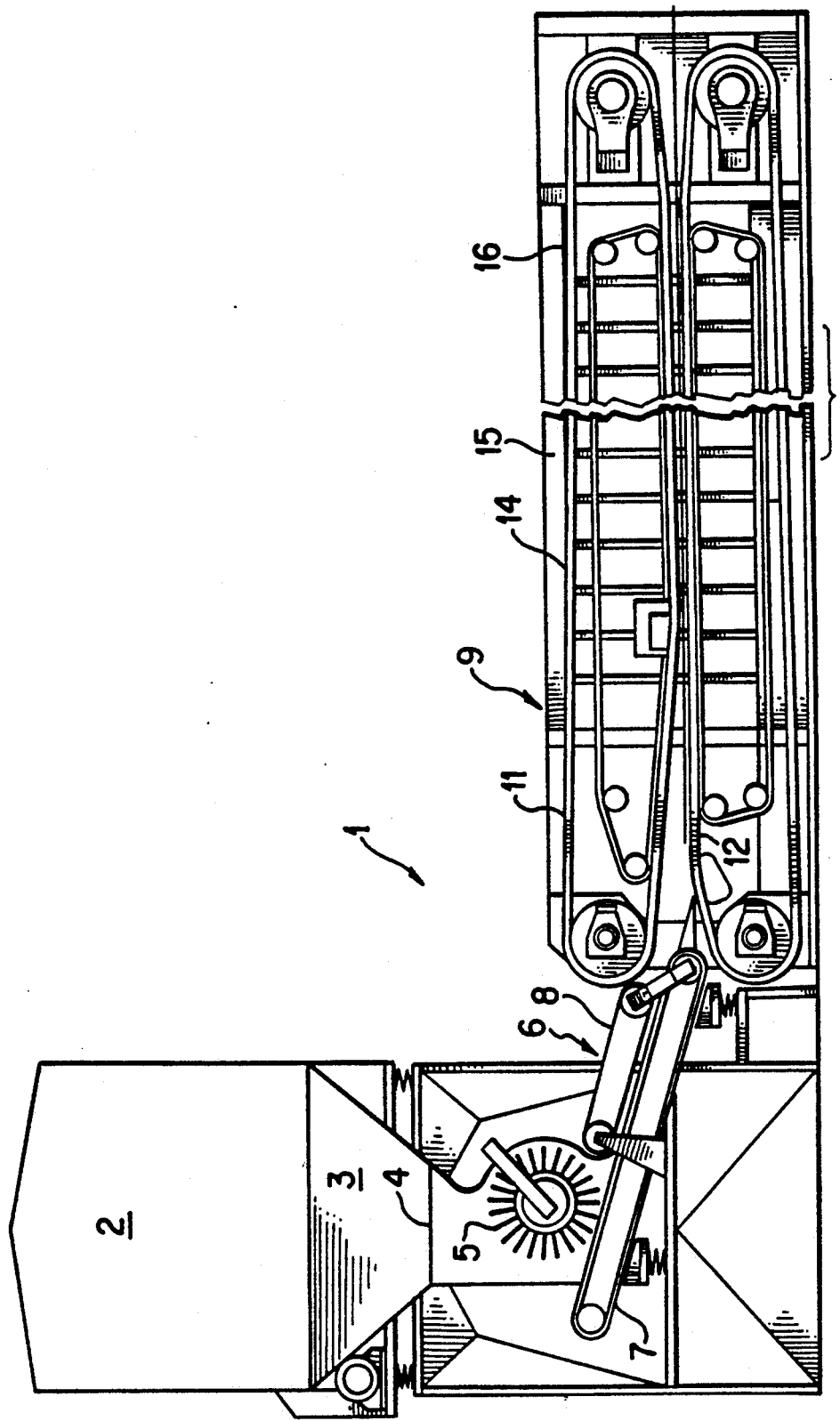
FIG. 1 schematically shows a side view of the apparatus constructed according to the invention.

Turning attention now specifically to FIG. 1 of the drawings, an apparatus or installation 1 for fabricating highly compressed covering material and illustrated therein by way of example and not limitation will be seen to comprise a substantially cylindrical container or receptacle 2 for the lumpy plastics material or plastics pre-product which, in the form of pellets, chips, shavings and the like, is the basis or starting material for the covering material to be fabricated. The container 2 comprises a lower portion 3 which is funnel-shaped and leads to an opening or outlet 4, the width or extent of which is controllable. A star feeder 5 is arranged below the opening or outlet 4. The lumpy plastics material or plastics pre-product from the container 2 is dosedly conveyed into a charging or feeding device 6 by means of the star feeder 5. This charging or feeding device 6 comprises a lower conveyor belt 7 and an upper conveyor belt 8, by means of which the desired plastics-material or plastics pre-product layer is preformed.

Figure 2:
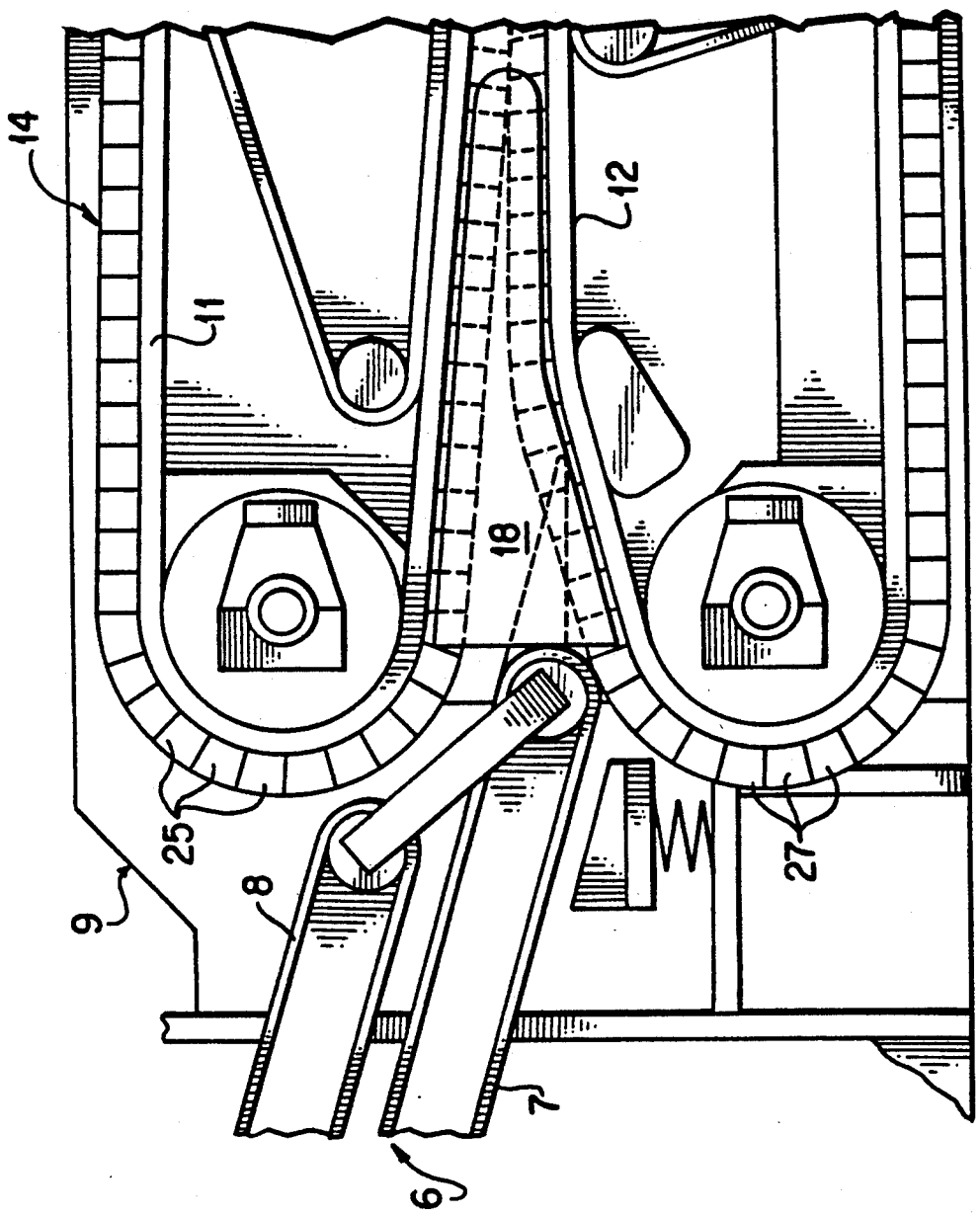
FIG. 2 schematically shows in a side view and in an enlarged illustration the entrance part or portion of a double-belt press of the apparatus according to FIG. 1.

As best seen by referring to FIG. 2, a heatable double-belt or twin-belt press 9 is arranged directly downstream of the conveyor belts 7 and 8, as viewed in the direction of conveyance of the material. This double-belt press 9 comprises two pressing belts or bands 11 and 12 which are impinged with pressure, as well as a heating system which, just like the pressure, is separately controllable in three sections 14, 15 and 16 of the double-belt press 9.

Figure 3:
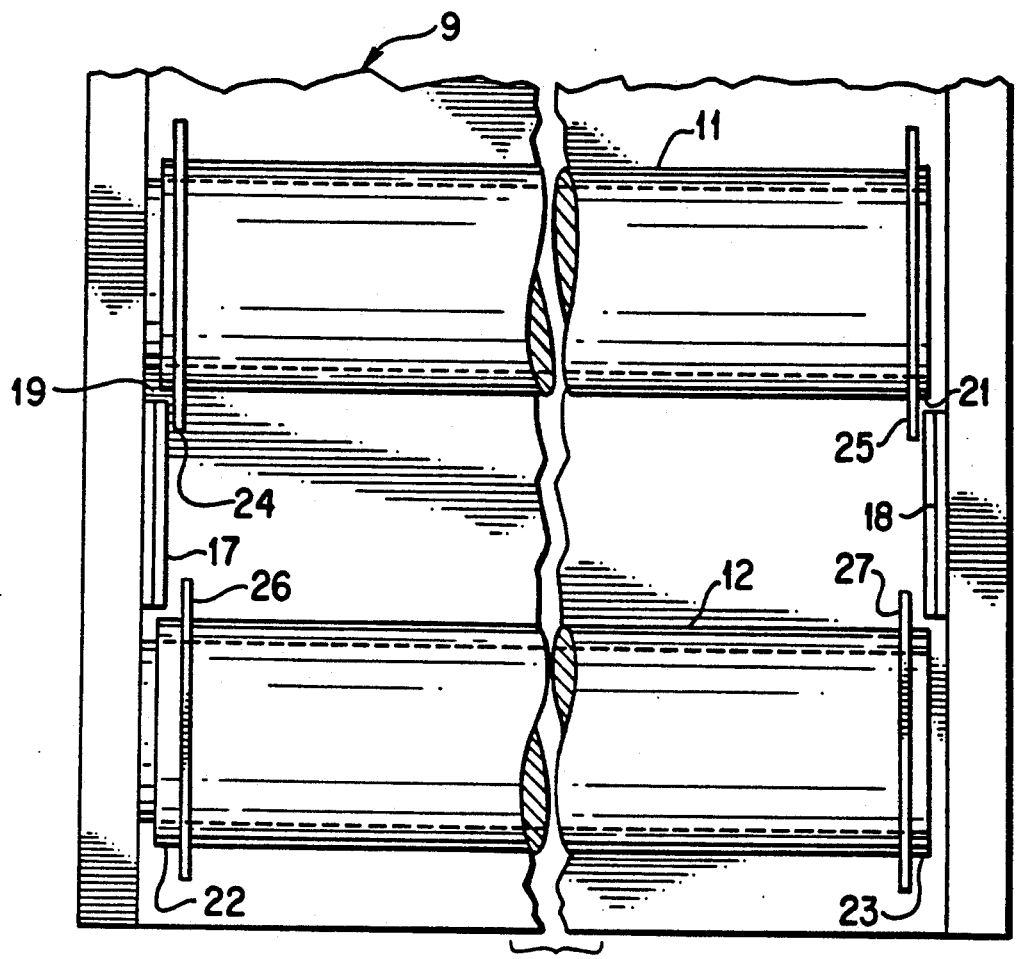
FIG. 3 schematically shows a front view of the feeding side of the double-belt press.
Figure 4:
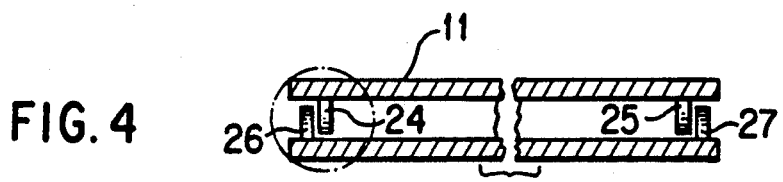
FIG. 4 schematically shows a sectional view of a first exemplary embodiment of the belts of the double-belt press.

At the feeding end of the double-belt press 9, as depicted in FIGS. 2 and 3, there are arranged at both sides respective guide plates 17 and 18 for the purpose of preventing the exit of infed pieces of the plastics material or plastics pre-product. This is particularly important at this location, because the impinged pressing belts or bands 11 and 12 of the double-belt press 9 move towards each other at an angle such that material displacement or movement cannot be excluded. Along edges 19 and 21 of the upper pressing belt or band 11 and along edges 22 and 23 of the lower pressing belt or band 12, there are provided rows of delimiting plates or elements 24, 25 and 26, 27, respectively. The delimiting plates 24 and 25 of the upper pressing belt or band 11 and the delimiting plates 26 and 27 of the lower pressing belt or band 12 determine the lateral dimensions of the plastics-material layer, as will be recognized from inspecting FIGS. 3 and 4. These delimiting plates or elements 24, 25 and 26, 27 are appropriately mounted at their respective pressing belts or bands 11 and 12 and, accordingly, are entrained or conjointly conveyed by the latter. The two pressing belts or bands 11 and 12 as well as their respective delimiting plates or elements 24, 25 and 26, 27 are preferably coated with Teflon, in order to avoid adhesion or sticking of the plastics material.

Figure 5:
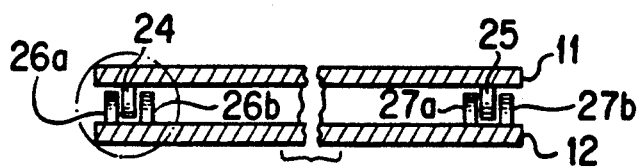
FIG. 5 schematically shows a sectional view of a second exemplary embodiment of the belts of the double-belt press.

A particular embodiment of the delimiting plates or elements is shown in FIG. 5. The lower pressing belt or band 12 comprises respective pairs of parallel rows of delimiting plates or elements 26a, 26b and 27a, 27b, between which the respective rows of delimiting plates or elements 24 and 25 of the upper pressing belt or band 11 can engage when the two pressing belts or bands 11 and 12 are in their conjointly pressed condition. It is evident from FIGS. 4 and 5 of the drawings that the delimiting plates or elements, even under maximum pressure, do not contact their respective opposite pressing belt or band, so that at all time there is a spacing between the lower delimiting plates 26, 27 and the upper pressing belt or band 11, between the lower delimiting plates 26a, 26b, 27a, 27b and the upper pressing belt or band 11, and between the upper delimiting plates 24, 25 and the lower pressing belt or band 12. As a result, excess plastics material can escape at this location. The delimiting plates or elements are fixedly arranged at their respective pressing belts or bands 11 and 12 and comprise a sufficiently short length to readily enable or allow deflection of the pressing bands or belts 11 and 12.

The method of, and apparatus for, fabricating highly compressed covering material from a lumpy plastics material or plastics pre-product are further elucidated by the following three examples:

| example: | EXAMPLES I, II and III | | |
|---|---|---|---|
| | I | II | III |
| PVC | 45 | 50 | 55 |
| softeners | 20 | 13 | 13 |
| stabilizers | 2 | 1.5 | 1.5 |
| fillers | 30 | 35 | 26 |
| pigments | 2 | — | 4.4 |
| process materials | 1 | 0.5 | 0.1 |
| size of PVC chips | 50 × 5 mm | 25 × 3 mm | 1 × 5 mm |

All numerical data refer to percentage by weight.

The pressing operation was performed in a double-belt press 9 as illustrated in FIGS. 1 through 3. The heating temperature of the first section 14 of the double-belt press 9 was 120° C. The heating temperature of the second section 15 was 160° C. to 180° C. and the heating temperature of the third section 16 was 70° C. to 80° C. Of course, the temperature of the plastics material in the third section 16 was substantially higher than the heating temperature, i.e. approximately 120° C. It is thereby desirable that the temperature of the plastics material in the third section 16 is above the second order transition temperature. In one of the three tests, the working pressure was 25 bar in the first section 14, it increased along the second section 15 and was substantially uniform or invariable in the third section 16. In another one of these tests, work was carried out under a pressure that increased to 25 bar in the second section 15 and then was substantially constant in the third section 16. In a third test, operating pressure was increased to reach 50 bar in the third section 16.

While there are shown and described present preferred embodiments of the invention, it is to be distinctly understood that the invention is not limited thereto, but may be otherwise variously embodied and practiced within the scope of the following claims. Accordingly,

What we claim is:

1. A continuous method of fabricating highly compressed plastic floor covering material from a lumpy plastics material, comprising the steps of:
feeding the lumpy plastics material into a double-belt press by continuously and dosedly feeding the lumpy plastics material into a region formed by lateral delimitations at the lower belt of the double-belt press;
subjecting the lumpy plastics material to continuous heating and to continuously increasing pressure thereby removing along a first section of the pressing stretch of the double-belt press the air existing in developing covering material under increasing pressure.

2. The method as defined in claim 1, further comprising the step of pressing the developing covering material to the desired density along a second section of the pressing stretch; and
stabilizing the obtained covering material along a third section of the pressing stretch.

3. The method as defined in claim 2, wherein:
said stabilizing step along the third section of the pressing stretch entails reducing heating and maintaining the pressure constant with respect to the second section.

4. The method as defined in claim 2, wherein:
said stabilizing step along the third section of the pressing stretch entails reducing heating and increasing the pressure with respect to the second section.

5. The method as defined in claim 2, wherein:
said step of continuously and dosedly feeding the lumpy plastics material entails feeding the lumpy plastics material in the form of a layer of constant thickness into the region formed by lateral delimitations at the lower belt of the double-belt press.

6. The method as defined in claim 2, wherein:
said step of continuously and dosedly feeding the lumpy plastics material entails feeding the lumpy plastics material in the form of a layer into the region formed by lateral delimitations at the lower belt of the double-belt press; and
said layer having a thickness which is larger in the middle and decreases towards the edges thereof.

7. The method as defined in claim 2, wherein:
the plastics material is polyvinyl chloride.

8. The method as defined in claim 2, wherein:
the plastics material is polyethylene.

9. The method as defined in claim 2, wherein:
the plastics material is polypropylene.

10. The method as defined in claim 2, wherein:
the plastics material is polyurethane.

11. The method as defined in claim 2, wherein:
the lumpy plastics material is a lumpy plastics pre-product.

12. The, method as defined in claim 11, wherein:
said plastics pre-product is a polyester.

13. The method as defined in claim 11, wherein:
said plastics pre-product is an epoxy resin.

14. The method as defined in claim 2, wherein:
the lumpy plastics material contains a conductive material.

15. The method as defined in claim 14, wherein:
said conductive material is carbon black.

16. The method as defined in claim 2, wherein:

the lumpy plastics material is coated with a conductive material.

17. The method as defined in claim 16, wherein: said conductive material is carbon black.

18. The method as defined in claim 2, wherein: said pressing step entails pressing with pressures of 25 bar to 50 bar.

* * * * *